United States Patent
Gao et al.

(10) Patent No.: US 8,935,129 B1
(45) Date of Patent: Jan. 13, 2015

(54) SYSTEM AND METHOD FOR SIMPLIFYING A GRAPH'S TOPOLOGY AND PERSEVERING THE GRAPH'S SEMANTICS

(75) Inventors: Hong Gao, Downingtown, PA (US); Xun Zhou, Chester Springs, PA (US)

(73) Assignee: Bentley Systems, Incorporated, Exton, PA (US)

( * ) Notice: Subject to any disclaimer, the term of this patent is extended or adjusted under 35 U.S.C. 154(b) by 693 days.

(21) Appl. No.: 12/794,482

(22) Filed: Jun. 4, 2010

(51) Int. Cl.
- *G06F 17/50* (2006.01)
- *G06T 11/20* (2006.01)
- *G06F 17/30* (2006.01)
- *G06T 9/40* (2006.01)
- *G06T 17/20* (2006.01)

(52) U.S. Cl.
CPC ............. *G06F 17/30958* (2013.01); *G06T 9/40* (2013.01); *G06T 17/20* (2013.01); *G06T 11/206* (2013.01)
USPC ............... 703/1; 345/440; 345/419; 345/420; 345/619

(58) Field of Classification Search
CPC .................................. G06F 17/30958
USPC ............................. 703/1; 345/440
See application file for complete search history.

(56) References Cited

U.S. PATENT DOCUMENTS

| | | | | |
|---|---|---|---|---|
| 4,905,163 A | * | 2/1990 | Garber et al. | 706/55 |
| 5,333,254 A | * | 7/1994 | Robertson | 715/853 |
| 5,450,535 A | | 9/1995 | North | |
| 5,454,068 A | * | 9/1995 | Ramanujam | 345/419 |
| 5,537,523 A | * | 7/1996 | Harashima et al. | 345/440 |
| 5,559,995 A | * | 9/1996 | Browning et al. | 345/419 |
| 5,825,369 A | * | 10/1998 | Rossignac et al. | 345/440 |
| 5,896,139 A | * | 4/1999 | Strauss | 345/440 |
| 5,905,507 A | * | 5/1999 | Rossignac et al. | 345/440 |
| 5,940,083 A | | 8/1999 | Broekhuijsen | |
| 6,108,698 A | * | 8/2000 | Tenev et al. | 709/220 |
| 6,154,220 A | * | 11/2000 | Prakriya et al. | 345/440 |
| 6,184,897 B1 | * | 2/2001 | Gueziec et al. | 345/440 |
| 6,233,571 B1 | * | 5/2001 | Egger et al. | 715/205 |
| 6,259,458 B1 | * | 7/2001 | Theisen et al. | 345/440 |
| 6,285,367 B1 | | 9/2001 | Abrams et al. | |
| 6,452,596 B1 | * | 9/2002 | Gueziec et al. | 345/440 |
| 6,509,898 B2 | * | 1/2003 | Chi et al. | 345/440 |

(Continued)

FOREIGN PATENT DOCUMENTS

EP    1480136 A2    11/2009

OTHER PUBLICATIONS

Aish, R., et al., "Multi-Level Interaction in Parametric Design," Aug. 2005, pp. 1-12.

(Continued)

*Primary Examiner* — Akash Saxena
(74) *Attorney, Agent, or Firm* — Cesari and McKenna, LLP

(57) ABSTRACT

In one embodiment, a technique is provided for maintaining semantics of a graph that corresponds to a model of a physical entity. Node data structures are defined, instantiations of which are used to represent primitive nodes and group nodes of the graph. Link data structures are defined, instantiations of which are used to represent primitive links and group links of the graph. A technique for grouping nodes of the graph is provided, which may be used to remove elements from the graph to create a simplified representation. A technique for ungrouping nodes of the graph is provided, which may be used to restore elements to the graph to return to an unsimplified representation.

23 Claims, 17 Drawing Sheets

(56) References Cited

U.S. PATENT DOCUMENTS

| | | | |
|---|---|---|---|
| 6,563,500 B1* | 5/2003 | Kim et al. | 345/423 |
| 6,570,564 B1* | 5/2003 | Sowizral et al. | 345/440 |
| 6,741,242 B1* | 5/2004 | Itoh et al. | 345/419 |
| 6,751,609 B2* | 6/2004 | Nomura | 701/461 |
| 6,785,674 B2* | 8/2004 | Vu | 707/999.003 |
| 6,801,200 B1* | 10/2004 | Prakriya et al. | 345/440 |
| 6,952,208 B1* | 10/2005 | Arquie et al. | 345/440 |
| 7,324,102 B2* | 1/2008 | Inzinga et al. | 703/1 |
| 7,519,603 B2* | 4/2009 | Parker | 345/420 |
| 7,532,133 B2* | 5/2009 | Ahn et al. | 341/51 |
| 7,593,009 B2* | 9/2009 | Woo et al. | 345/419 |
| 7,788,254 B2* | 8/2010 | Burges et al. | 707/710 |
| 7,809,758 B2* | 10/2010 | Thurnhofer et al. | 707/797 |
| 7,855,978 B2* | 12/2010 | Beaudoin | 370/254 |
| 8,006,230 B2* | 8/2011 | Agarwal et al. | 717/120 |
| 8,026,916 B2* | 9/2011 | Wen | 345/423 |
| 8,204,720 B2* | 6/2012 | Wiemer et al. | 703/2 |
| 8,631,041 B2* | 1/2014 | King et al. | 707/796 |
| 2001/0042062 A1* | 11/2001 | Tenev et al. | 707/3 |
| 2001/0045952 A1* | 11/2001 | Tenev et al. | 345/440 |
| 2002/0089499 A1* | 7/2002 | Lee et al. | 345/419 |
| 2002/0165701 A1* | 11/2002 | Lichtenberg et al. | 703/7 |
| 2004/0193705 A1* | 9/2004 | To et al. | 709/223 |
| 2005/0007383 A1 | 1/2005 | Potter et al. | |
| 2005/0192986 A1* | 9/2005 | Butler | 707/100 |
| 2005/0234946 A1* | 10/2005 | Woo et al. | 707/100 |
| 2005/0256887 A1* | 11/2005 | Eiron et al. | 707/100 |
| 2005/0267902 A1* | 12/2005 | Thurnhofer et al. | 707/100 |
| 2006/0184566 A1* | 8/2006 | Lo et al. | 707/102 |
| 2007/0109302 A1* | 5/2007 | Tsuboshita et al. | 345/440 |
| 2008/0033987 A1* | 2/2008 | Carter | 707/103 R |
| 2008/0098018 A1* | 4/2008 | King et al. | 707/101 |
| 2008/0300834 A1* | 12/2008 | Wiemer et al. | 703/2 |
| 2009/0204373 A1 | 8/2009 | Brown et al. | |
| 2009/0213119 A1* | 8/2009 | Oh et al. | 345/423 |
| 2010/0085352 A1* | 4/2010 | Zhou et al. | 345/419 |
| 2010/0277481 A1* | 11/2010 | Cao et al. | 345/440 |
| 2010/0315416 A1* | 12/2010 | Pretlove et al. | 345/419 |
| 2011/0109626 A1* | 5/2011 | Geiger et al. | 345/419 |
| 2011/0169819 A1* | 7/2011 | Ian | 345/419 |
| 2011/0249002 A1* | 10/2011 | Duplessis et al. | 345/440 |
| 2012/0150819 A1* | 6/2012 | Lindahl et al. | 707/687 |
| 2013/0338858 A1* | 12/2013 | Cherepinsky et al. | 701/3 |

OTHER PUBLICATIONS

Hennessey, D., et al., "A Simplification Algorithm for Visualizing the Structure of Complex Graphs," Department of Computer Science, Drexel University, Philadelphia, PA, Jul. 2008, pp. 1-10.

Kraftcheck, J., "Virtual Geometry: A Mechanism for Modification of CAD Model Topology for Improved Meshability," Department of Mechanical Engineering, University of Wisconsin, Dec. 2000, pp. 1-62.

Sugiyama, K., et al., "Visualization of Structural Information: Automatic Drawing of Compound Digraphs," IEEE Transactions on Systems, Man and Cybernetics, vol. 21, No. 4, Jul./Aug. 1991, pp. 876-892.

* cited by examiner

SYSTEM AND METHOD FOR SIMPLIFYING A GRAPH'S TOPOLOGY AND PERSEVERING THE GRAPH'S SEMANTICS

BACKGROUND

1. Technical Field

The present disclosure relates generally to computer-aided design, and more specifically to techniques for simplifying graphs representing complex information relationships in a model.

2. Background Information

To better manage the complexities of modern designs, engineers and designers often turn to computer-aided design. In computer-aided design, an engineer or designer creates a model that embodies, or otherwise represents, a physical entity. For example, a model may represent a three-dimensional object or structure, such a building or component. The model is typically refined and analyzed by engineers and/or designers, sometime aided by analytical tools. During refinement and analysis, the engineers and/or designers may review the model from different perspectives, and consider different features thereof. A completed model may be used to generate documents (such as plans) useful in building the physical entity, or for other purposes.

The models of many physical entities contain large amounts of information that have complex information relationships. Graphs are often maintained by computer systems to represent the complex information relationships, and to facilitate their display to a user. In general, a graph (G) is a structure that comprises two sets: a set (V) of nodes and a set (E) of links (alternatively referred to as "edges") that connect nodes, such that a graph may be represented mathematically as G=<V,E>. The semantics (i.e., meaning) of a graph is typically defined by the semantics of the nodes (e.g., the portion of the physical entity each node represents), the semantics of the links (e.g., the relationship between portions of the physical entity the links signify), and the topology of the graph (e.g., the arrangement of the nodes and links). For example, in a graph corresponding to a three-dimensional structure being modeled, each node may represent a point, a line, a curve, a plane, etc., while each link may represent a relationship between nodes, and the arrangement of the nodes and links may define the contours of the three-dimensional object.

When a graph is presented to a user by a computer system, for example, on a display screen of the computer system, the user interprets (i.e., consumes) the semantics of the graph to understand the information being conveyed. When graphs are small and simple, the user may readily consume all the semantics being conveyed. For example, in a graph corresponding to a simple three-dimensional object, having a few nodes and links, the user may be able to readily interpret the semantics of the nodes, the semantics of the links, and the topology of the graph.

However, in the case of large, complex graphs, it may be difficult, or impossible, for a user to consume all the semantics of the graph at one time. The user may simply be overwhelmed by the amount of information presented. To address this issue, some modeling platforms attempt to group elements (e.g., links and nodes) to reduce the number of elements displayed to the user. In this manner, a simplified graph is created and then presented. However, such modeling platforms typically do not preserved all the semantics of the original graph. For instance, the semantics of the nodes and/or the semantics of the links are often not fully preserved in a form that permits a user to readily access the semantics (e.g., via a query) and/or to restore the graph to an unsimplified form (e.g., by ungrouping the elements). Typically, at least some semantics are not readily accessible and/or are not readily restorable. The loss of semantics may be particularly acute when graph simplification results in a large number of nested groups of elements, with semantics generally being lost when the levels of nesting increases beyond certain limits.

Accordingly, there is a need for improved techniques for simplifying a graph that represents complex information relations in a model of a physical entity, where such techniques better preserve graph semantics.

SUMMARY

According to one embodiment of the present disclosure, graph elements, including both primitive elements and group elements, are represented by data structures that maintain graph semantics. Further, special recursive grouping and ungrouping algorithms are applied to these data structures to simplify a graph to a less-granular representation while preserving the graph semantics, and fully restoring the graph to a more-granular representation. While in a simplified form, a user may readily access the semantics via a query entered in a user interface of a modeling application. Further, if a user edits or changes the simplified form of the graph, via the user interface of the modeling application, such changes may be propagated through the set of data structures and reflected when a more-granular representation of the graph is displayed.

Example data structures may include a node data structure, instantiations of which are used to represent each primitive node and group node, as well as a link data structure, instantiations of which are used to represent each primitive link and group link. The node data structure may include a node name (i.e., an identifier of the node on the graph), and a node reference (i.e., an indication of the semantics of the node). If the node data structure corresponds to a primitive node, the node reference may be empty. However, if the node data structure corresponds to a group node, the node reference may indicate a set of nodes and links subsumed by the group node. Similarly, the link data structure may include a link origin identifier (i.e., an identifier of where the link originates in the graph topology), a link destination identifier (i.e., an identifier of where the link terminates in the graph topology) and a link reference (i.e., an indication of the semantics of the link). If the link data structure corresponds to a primitive link, the link reference may be empty. However, if the link data structure corresponds to a group link, the link reference may indicate a set of links.

An example recursive grouping algorithm may first create a group node corresponding to a group of two or more selected nodes (e.g., primitive nodes or group nodes) to be subsumed. Each of the selected nodes may be added to a set of nodes in the nodes data structure. Any links (e.g., primitive links or group links) that extend between ones of the selected nodes may be added to the set of links in the node's data structure. Any links that extend between a selected node and a non-selected node may be identified. If there is at least one unexamined link between a selected node and a non-selected node, one such link is examined, and a determination is made whether a group link already exists between the group node and the non-selected node. If not, a group link may be created between the group node and the non-selected node. The examined link between the selected node and the non-selected node may be added to the listing of links in the group link's link data structure. Execution then loops back, until there are no more links between a selected node and a non-selected node. Then any selected nodes, and any links that exist between a selected node and a non-selected node, are removed from the graph, to create a less-granular (simplified) representation.

An example recursive ungrouping algorithm may first create each node (e.g., a primitive node or group node) in a set of nodes in a group node's data structure. Each link (e.g., a primitive link or group link) in a set of links in the group node's data structure may also be created. If there is at least one unexamined group link that connects directly to the group node, a group link is examined and the listing of links of that group data structure is accessed. For each link found in the listing of links, a link is created in the graph. Execution then loops back. Eventually, if there is not at least one unexamined group link that connects directly to the group node, the group node, and any links that connect directly to the group node, are removed from the graph, to create a more granular (unsimplified) representation.

Various other techniques, adaptations of techniques, and the like, may also and/or alternatively be employed, and this summary is merely provided as an illustrative example.

BRIEF DESCRIPTION OF THE DRAWINGS

The detailed description below refers to the accompanying drawings, of which.

DETAILED DESCRIPTION

Figure 1:
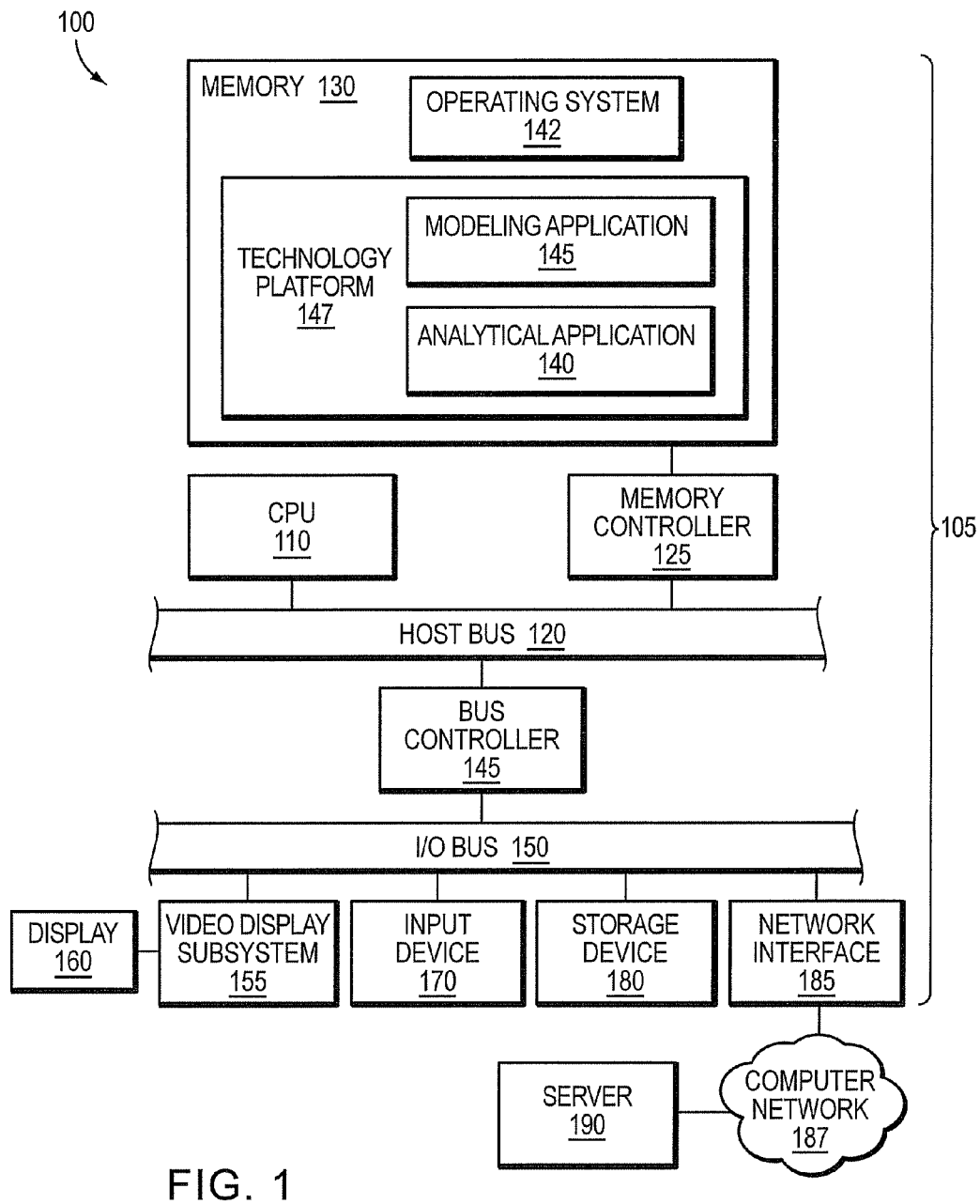
FIG. 1 is a schematic block diagram of an example computer system including an example computer (e.g., a desktop computer) interconnected to a server, in which at least some of the presently described techniques may be employed.

FIG. 1 is a schematic block diagram of an example computer system 100 including an example computer 105 (e.g., a desktop computer) interconnected to a server 190, in which at least some of the presently described techniques may be employed. The computer 105 includes at least one central processing unit (CPU) 110 coupled to a host bus 120. The CPU 110 may be any of a variety of commercially available processors, such as an Intel x86/x64 processor, or another type of processor. A volatile memory 130, such as a Random Access Memory (RAM), is coupled to the host bus 120 via a memory controller 125. The memory 130 is adapted to store at least a portion of an operating system 142 while the computer 105 is operating.

In addition, the memory 130 may store portions of other software, including a including portions of a modeling application 145, and in some cases, one or more analytical applications 140 operating within a technology platform 147. The modeling application 145 may maintain a model that embodies, or otherwise represents, a physical entity, the information relationships in the model being maintained in at least one graph. As explained in more detail below, a number of data structure may be used to maintain a graph. Such data structures may be loaded into the volatile memory 130 from the persistent storage device 180 when needed.

In one embodiment, the modeling application 145 may be an associative and parametric modeling application, such as the MicroStation Generative Components™ associative and parametric modeling application, available from Bentley Systems Inc. Further details regarding certain aspects of the MicroStation Generative Components Extension™ associative and parametric modeling application may be found in U.S. patent application Ser. No. 12/030,408, published as U.S. Publication No. 2009/0204373, filed Feb. 13, 2008 and titled "System, Method and Computer Program Product for Computer Modeling with Generative Components", which is incorporated by reference herein in its entirety. Further, in one embodiment, the technology platform 147 may be the MicroStation Triforma® technology platform, also available from Bentley Systems Inc.

It should be understood that both the modeling application 145 and the technology platform 147 may alternately be other applications. For example, the modeling application 145 may be a building analysis and design application, a plant design and engineering application, a communications network design application, a rail design application, an electric and gas utility network analysis and design application, a road and site design application, a water network analysis and design application, a mapping application, or any of a variety of other types of modeling applications that may maintain a model.

Returning to FIG. 1, the host bus 120 of the computer 105 is coupled to an input/output (I/O) bus 150 through a bus controller 145. A video display subsystem 155, coupled to a display screen 160, is coupled to the I/O bus 150. The display screen 160 may show a user interface of the modeling application 145, for example, a text-based user interface such as a command line, or a graphical user interface. One or more input devices 170, such as a keyboard, a mouse, etc., are provided and used for interaction with the computer 105, and the modeling application 145. A persistent storage device 180, such as hard disk drive, a solid-state drive, or other type or persistent data store, is coupled to the I/O bus 150, and may persistently store data, including computer-executable instructions. Persistently stored data may be loaded into the volatile memory 130 when needed. For example, computer-executable instructions related to the modeling application 145 may be stored in the persistent storage device 180 until they are needed. Similarly, the data structures used with a graph may be stored in the persistent storage device 180 until they are needed.

The I/O bus 150 may further be coupled to a network interface 185 that interfaces via a computer network 187 with one or more servers 190. Each server 190 may include components similar to computer 105, and together with computer 105 may facilitate a variety of parallel, distributed, virtualized and other computing arrangements. In general, it should be understood that the arrangement of computing platforms depicted in FIG. 1 is merely an example of one possible configuration.

Figure 2:
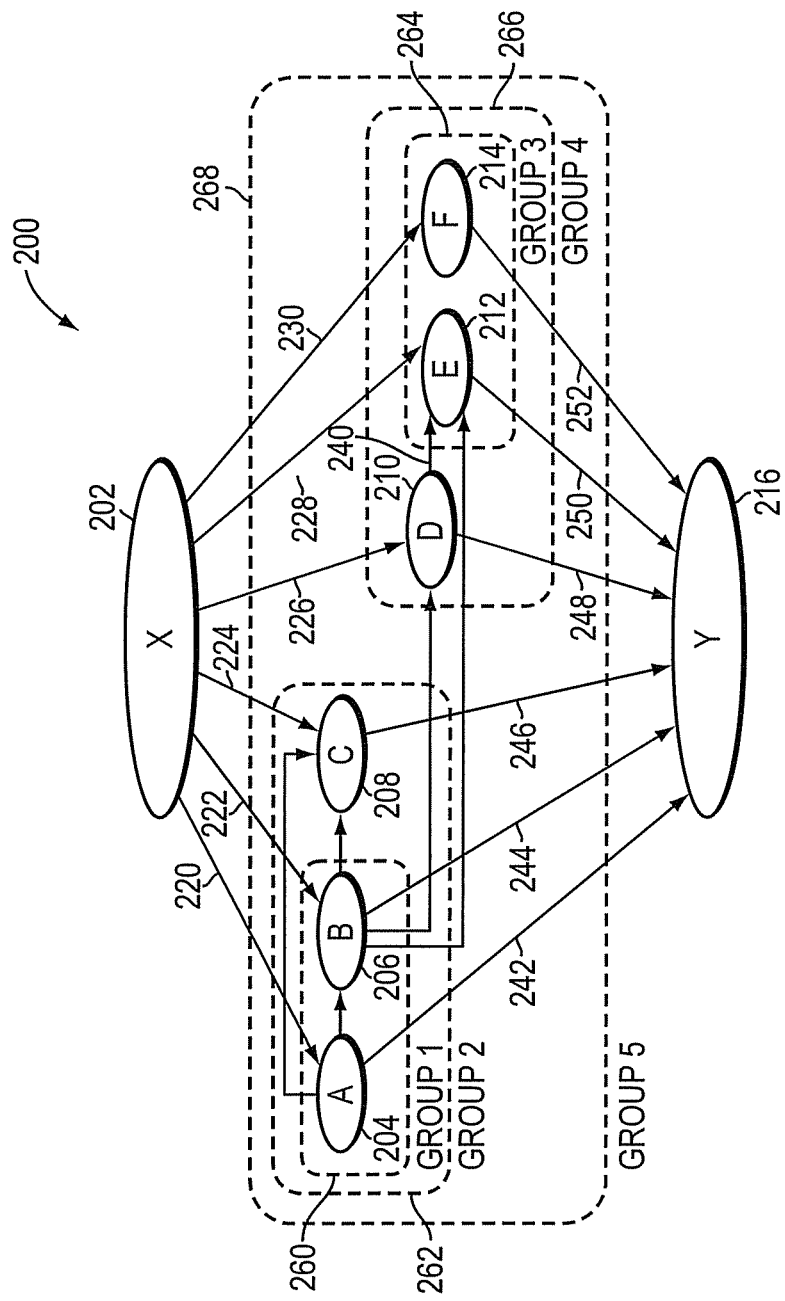
FIG. 2 is an abstracted diagram of an example graph that may be utilized by a modeling application to maintain information relationships for a model.

FIG. 2 is an abstracted diagram 200 of an example graph that may be utilized by a modeling application 145 to maintains information relationships for a model. The graph includes a plurality of primitive elements, including primitive nodes X 202, A 204, B 206, C 208, D 210, E 212, F, 214 and Y 216; and primitive links 220-252. As used herein, the term "primitive element" refers to an atomic component of a graph that is a basic building block of the graph. A primitive element may be a "primitive node", i.e., an atomic node within a graph. Further, a primitive element may be a "primitive link", i.e., an interconnection between atomic nodes within a graph.

The primitive nodes 202-216 of the graph may be logically grouped to facilitate simplification of the graph. Groups may be discrete collections of primitive nodes, or may nest among each other, such that a group may include other groups, as well as individual primitive nodes. For example, referring to FIG. 2, a first group ("Group 1") 260 may be delineated to include primitive node A 204 and primitive node B 206. A second group ("Group 2") 262 may be delineated to include Group 1 260 (which comprises primitive node A 202 and primitive node B 206) and primitive node C 208. Similarly, a third group ("Group 3") 264 may be delineated to include primitive node E 212 and primitive node F 214, while a fourth group ("Group 4") 266 may be delineated to include Group 3 264 (which comprises primitive node E 212 and primitive node F 214) and primitive node D 210. Further, a fifth group ("Group 5") 268 may be delineated to include Group 2 (which comprises Group 1 (which comprises primitive node A 204 and primitive node B 206) and primitive node C 208) and Group 4 (which comprises Group 3 (which comprises primitive node E 212 and primitive node F 214) and primitive node D 210).

Elements of a graph may be represented in a simplified graph topology as group elements, which replace the underlying graph elements. As user herein, the term "group element" refers to a type of graph element that includes at least two elements (either primitive elements or other group elements). A group element may be a "group node", i.e., a type of graph node that includes at least two nodes (either primitive nodes or other group nodes), and optionally also includes one or more primitive links and/or one or more group links. Similarly, a group element may be a "group link", i.e., a type of link that extends between a group node and a primitive node, or that extends between a group node and another group node.

Figure 3:
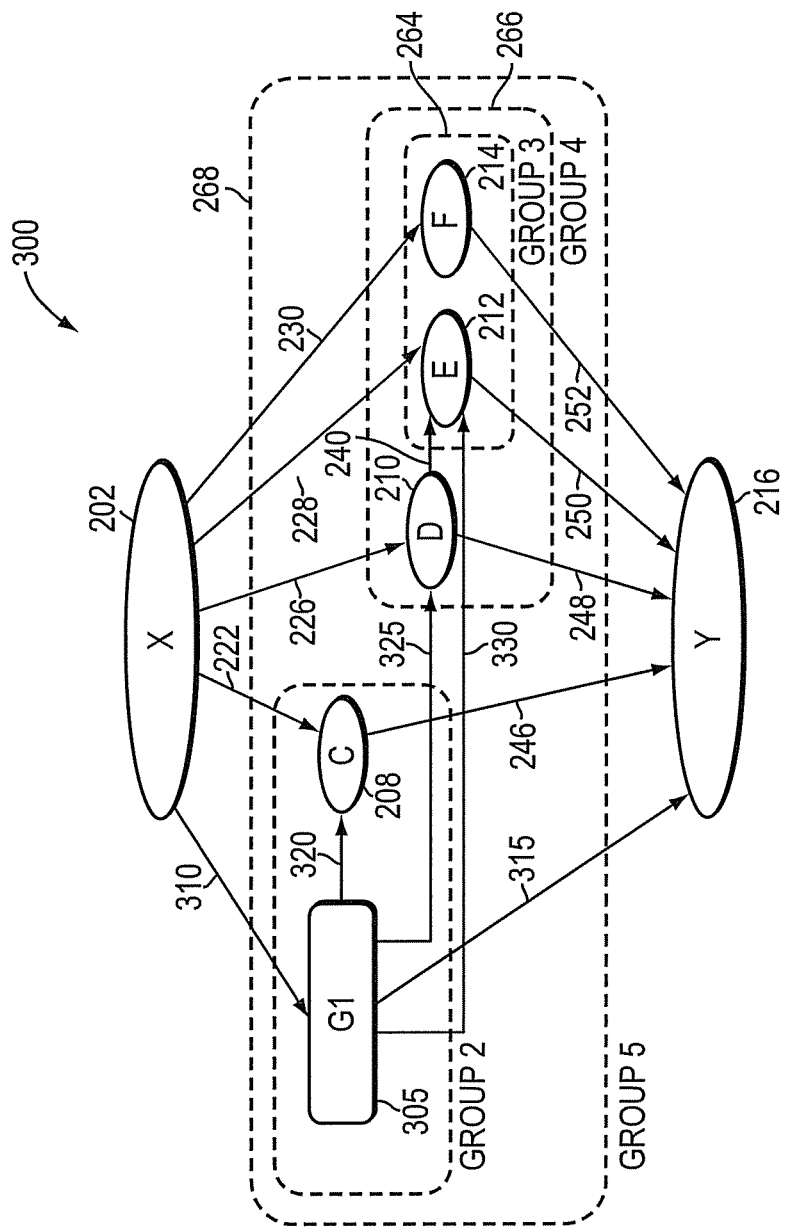
FIG. 3 is an abstracted diagram of the example graph of FIG. 2, showing Group 1 replaced by group node G1.

FIG. 3 is an abstracted diagram 300 of the example graph of FIG. 2, showing Group 1 260 replaced by group node G1 305. With the creation of group node G1 305, primitive node A 204 and primitive node B 206 are removed from the graph topology. Thereby, a simplified graph is created by the modeling application 145 for display to a user, for example, in a user interface on display screen 160.

When primitive nodes 202-216 are logically grouped, some primitive links 220-252 may be fully subsumed within a particular group. For example, primitive link (FIG. 1) 232 between primitive node A 204 and primitive node B 206 may be fully subsumed within Group 1 260. As can be seen in FIG. 3, the establishment of Group 1 260 removes primitive link 232 from the graph topology.

Other primitive links, while not fully subsumed, may be merged or adapted to account for the establishment of groups. Primitive links may be merged where they would be redundant after formation of a group. For example, primitive link (FIG. 1) 220 between primitive node X 202 and primitive node A 204, and primitive link (FIG. 1) 222 between primitive node X 202 and primitive node B 206, may be merged upon the establishment of Group 1 260, and replaced by a single link (FIG. 3.) 310. Similarly, primitive links may be adapted where they would lead to nodes that no long are a part of the visible graph topology after the grouping. For example, primitive link (FIG. 1) 234 between primitive node B 206 and primitive node C 208 may be adapted to account for the establishment of Group 1 260, and be replaced by a link 320 between Group 1 260 and primitive node C 208.

As discussed above, some modeling platforms do not fully preserved all the semantics of a graph when groups are established to simplify a graph. For instance, the semantics of the nodes and/or the semantics of the links, are typically not fully preserved in a form that permits a user to readily access the semantics (e.g., via a query) and/or to restore the graph to an unsimplified form (e.g., by ungrouping the elements). The loss of semantics may be particularly acute when the simplification results in a large number of nested groups of elements, with semantics being lost as the levels of nesting increases beyond certain limits. Such deficiencies may be addressed by the embodiments described herein.

According to one embodiment of the present disclosure, graph elements, including both primitive elements and group elements, are represented by data structures that maintain graph semantics. Further, special recursive grouping and ungrouping algorithms are applied to these data structures to simplify a graph to a less-granular representation, while preserving the graph semantics, to allow for fully restoring the graph to a more-granular representation. While in a simplified form, a user may readily access the semantics via a query entered in a user interface of the modeling application 145. Further, if a user edits or changes the simplified form of the graph, via the user interface of the modeling application 145, the such changes may be propagated through the set of data structures and reflected when a more-granular representation of the graph is displayed.

In one embodiment, the data structures include a node data structure, instantiations of which are used to represent each primitive node and group node, as well as a link data structure, instantiations of which are used to represent each primitive link and group link. The node data structure may include a node name (i.e., an identifier of a the node on the graph), and a node reference (i.e., an indication of the semantics of the node). If the node data structure corresponds to a primitive node, the node reference may be empty. However, if the node data structure corresponds to a group node, the node reference may indicate, for example, recursively, a set of nodes and links subsumed by the group node. Similarly, the link data structure may include a link origin identifier (i.e., an identifier of where the link originates in the graph topology), a link destination identifier (i.e., an identifier of where the link terminates in the graph topology) and a link reference (i.e., an indication of the semantics of the link). If the node data structure corresponds to a primitive link, the link reference may be empty. However, if the link data structure corresponds to a group link, the link reference may indicate, for example, recursively, a set of links.

The data structures, in one embodiment, are defined in a .NET languages understandable by the modeling application 145, such as C# and VB.NET. In other embodiments, the data structures may be defined in a wide variety of other programming languages.

Figure 4A:
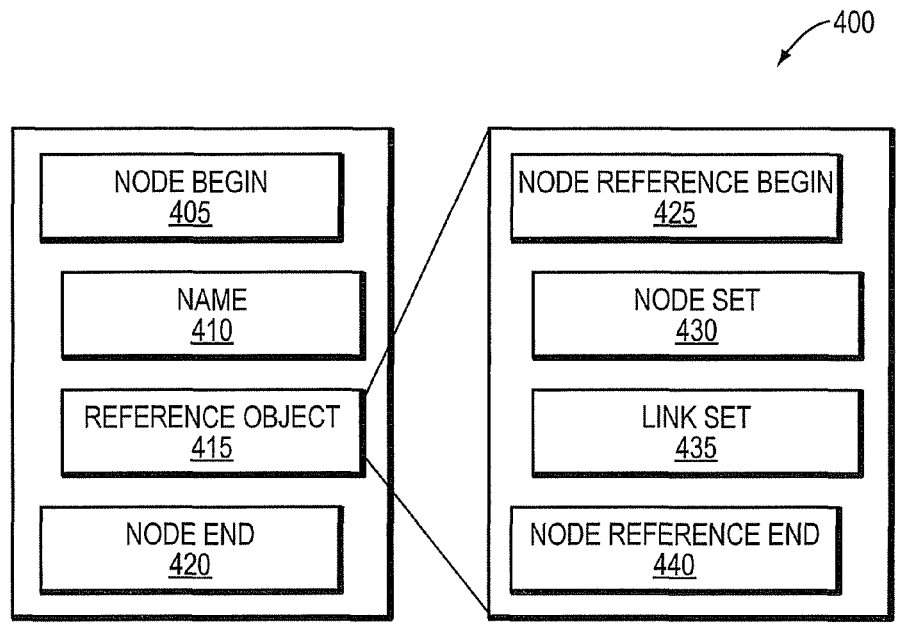
FIG. 4A is a block diagram of an example node data structure.

FIG. 4A is a block diagram of an example node data structure 400. The node data structure 400 begins with a node data structure start tag ("Node Begin") 405 that indicates the start of the data structure. A node name ("Name") 410 follows the start tag 405, and a node reference ("Reference Object") 415, in some cases, follows the node name 410. As mentioned above, if the node is a primitive node, the node reference may be empty (i.e., no Reference Object may be present). However, if the node is a group node, a node reference ("Reference Object" 415) may indicate nodes and links subsumed by the group node. In such case, the node reference ("Reference Object") 415 may be structured as a sub-data structure, beginning with its own start tag ("Node Reference Begin") 425. A set of nodes ("Node Set") 430 subsumed by the node may be indicated between a pair of start and end tags (not shown). Similarly, a set of links ("Link Set") 435 subsumed by the node may be indicated between another pair of start and end tags (not shown). It should be understood that the subsumed nodes may themselves be group nodes, and that the subsumed links may themselves be group links. The node reference ("Reference Object") 415 may terminate with its own end tag ("Node Reference End") 440. Finally, the entire node data structure may terminate with an end tag ("Node End") 420.

For ease of describing the example grouping and ungrouping algorithms of the present disclosure, the example node data structure 400, is may be referred to with the shorthand expression:

{Name, {{Node Set},{Link Set}}} where the primitive nodes are abbreviated as a single letter (e.g., "X", "A", "B", "C", "D", "E", "F", "Y", etc.), group nodes are abbreviated as "G"+a group number (e.g., "G1", "G2", "G3", "G4", "G5" etc.), primitive links are abbreviated as a "from" node letter+a "to" node letter (e.g., "AB" for a link from node A to node B, "BC" for a link from node B to node C, etc.), and group links are abbreviated as a "from" node letter or group number+a "to" node letter or group number (e.g., "X1" for a group link from primitive node X to group node 1, etc.).

Figure 4B:
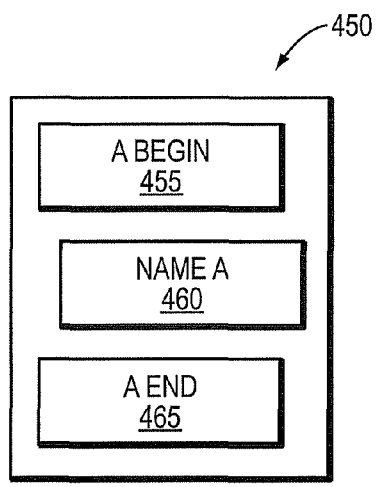
FIG. 4B is a block diagram for an example node data structure corresponding to primitive node A in FIG. 2.

FIG. 4B is a block diagram for an example node data structure 450 corresponding to primitive node A 204 in FIG. 2, that illustrates use of the node data structure 400. The example node data structure 450 corresponding to node A 204 begins with a node data structure start tag ("A Begin") 455. A node name ("Name A") 460 follows the start tag 455. Since node A 204 is a primitive node, no Reference Object is present. The node data structure 450 terminates with an end tag ("A End") 465. Using the short hand discussed above, the example node data structure 450 corresponding to primitive node A 204, may be abbreviated with the shorthand expression:

{A, {{Empty},{Empty}}}

Figure 4C:
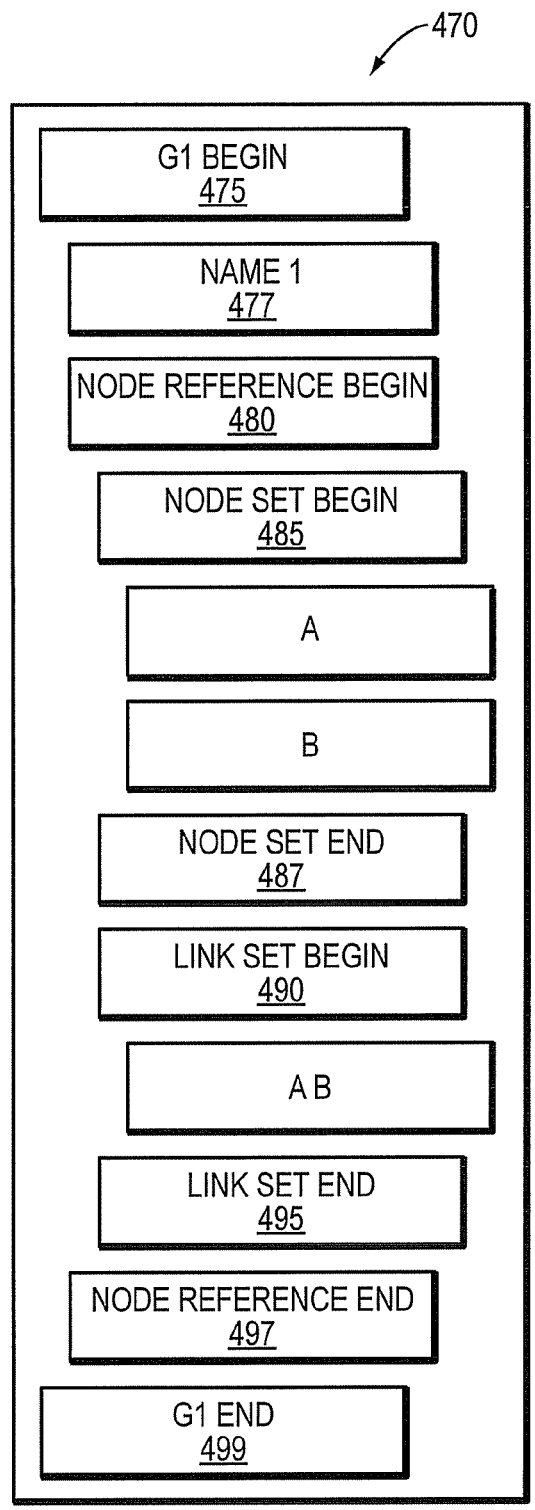
FIG. 4C is a block diagram for an additional example node data structure corresponding to group node G1 in FIG. 3.

FIG. 4C is a block diagram for an additional example node data structure 470 corresponding to group node G1 305 in FIG. 3, that illustrates use of the node data structure 400. The example node data structure 470 corresponding to group node G1 305 begins with a node data structure start tag ("G1 Begin") 475. A node name ("Name 1") 477 follows the start tag 475. Since node G1 305 is a group node, a Reference Object is present, beginning with a start tag ("Node Reference Begin") 480. A node set start tag ("Node Set Begin") 485, is followed by indications group node G1 305 subsumes primitive nodes A and B. The list of nodes is terminated by an end tag ("Node Set End") 487. Similarly, a link set start tag ("Link Set Begin") 490, is followed by an indication link AB is subsumed, which is in turn is followed by an end tag ("Link Set End") 495. The node set ends with an end tag ("Node Set End") 497. Finally, the node data structure 470 terminates with an end tag ("G1 End") 499.

Using the short hand discussed above, the example node data structure 470 corresponding to group node G1 305, may be abbreviated with the shorthand expression:

{A, {{A, B},{A, B, Empty}}}

Figure 5A:
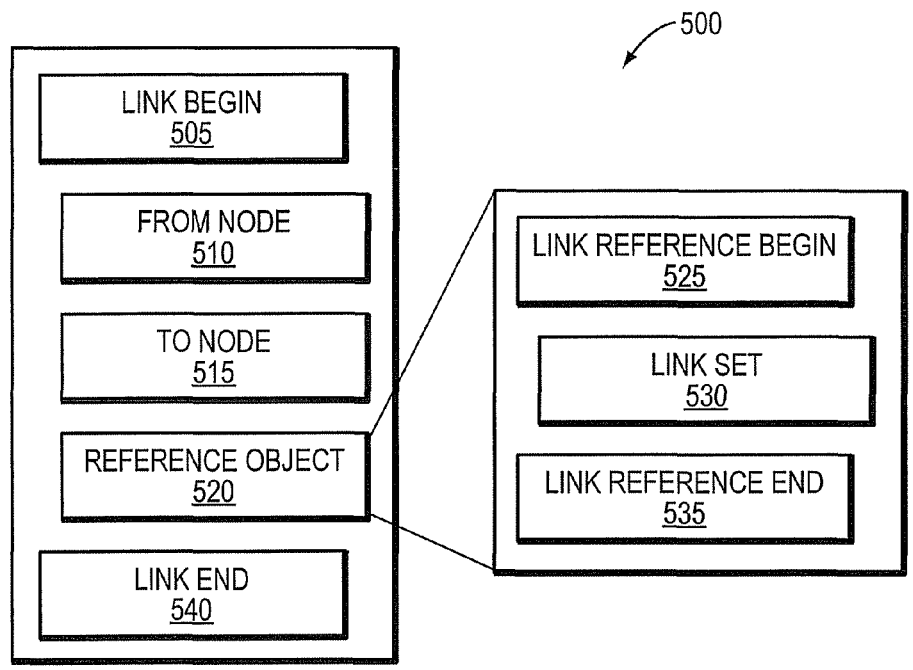
FIG. 5A is a block diagram of an example link data structure.

FIG. 5A is a block diagram of an example link data structure 500. The link data structure 500 begins with a link data structure start tag ("Link Begin") 505 that indicates the start of the data structure. An indication of where the link extends from ("From Node") 510 follows the start tag 505, and an indication of where the link extends to ("To Node") 515, follows thereafter. In some cases, a link reference ("Reference Object") 520, in present. As mentioned above, if the link is a primitive link, the link reference may be empty (i.e., no Reference Object 520 may be present). However, if the link is a group link, a Reference Object 520 may indicate links subsumed or replaced by the group link. In such case, the Reference Object 520 may be structured as a sub-data structure, beginning with its own start tag ("Link Reference Begin") 525. A listing of links ("Link Set") 530 subsumed or replaced by the group link is listed. It should be understood that links in the subsumed or replaced links may themselves be group links. The Reference Object 520 may terminate with its own end tag ("Link Reference End") 535. Finally, the entire node data structure may terminate with an end tag ("Link End") 540.

For ease of describing the grouping and ungrouping algorithms of the present disclosure, the example link data structure 500 may be referred to with the shorthand expression:

{From Node, To Node, Link Set} using the same abbreviations for primitive nodes, group nodes, primitive links and group links discussed above, in reference to the example node data structure 400.

Figure 5B:
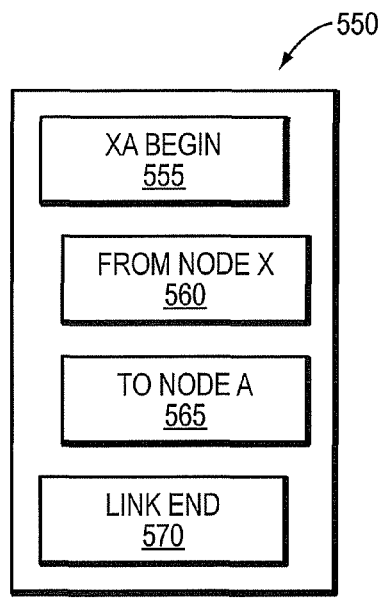
FIG. 5B is a block diagram for an example link data structure corresponding to the primitive link from node X to node A (link "XA") in FIG. 2.

FIG. 5B is a block diagram for an example link data structure 550 corresponding to the primitive link from node X 202 to node A 204 (link "XA") in FIG. 2, that illustrates use of the link data structure 550. The example link data structure 550 corresponding to link XA begins with a link data structure start tag ("XA Begin") 555. An indication of where the link extends from ("From Node X") 560 follows the start tag 555. Further, there is an indication of where the link extends to ("To Node A") 565. Since link XA 220 is a primitive link, no Reference Object is present. The link data structure 550 terminates with an end tag ("Link End") 570. Using the short hand discussed, the example link data structure 550 corresponding to the primitive link from node X 202 to node A 204, may be abbreviated with the shorthand expression:

{X, A, Empty}

Figure 5C:
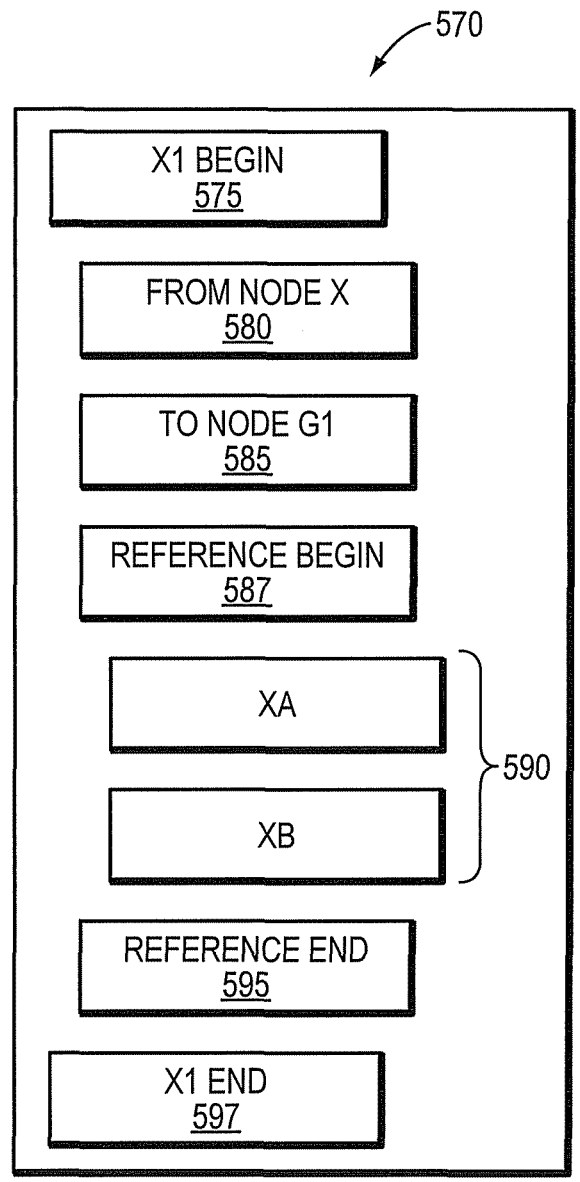
FIG. 5C is a block diagram for an additional example link data structure corresponding to group link X1 in FIG. 3.

FIG. 5C is a block diagram for an additional example link data structure 570 corresponding to group link X1 310 in FIG. 3, that illustrates use of the link data structure 500. The example link data structure 570 corresponding to group link X1 310 begins with a link data structure start tag ("X1 Begin") 575. An indication ("From Node X") 580 that the link begins a node X 202 follows the start tag 575. Further, there is an indication ("To Node G1") 585 that the link extends to group node G1 305. Since link X1 310 is a group link, a Reference Object is present, beginning with a start tag ("Reference Begin") 587. A listing of links ("XA, XB") 590 indicates that links XA and XB are subsumed by the group link, which is in turn followed by an end tag ("Reference End") 595. The link data structure 570 terminate with an end tag ("X1 End") 597.

Using the short hand discussed above, the example link data structure 570 corresponding to group link X1 310 in FIG. 3, may be abbreviated with the shorthand expression:

{X, G1,{XA, XB}}

The above described data structures may be used with special recursive grouping and ungrouping algorithms to simplify a graph to a less-granular representation while preserving the graph semantics, and fully restoring the graph to a more-granular representation. Such algorithms may take advantage of the unified data structure formats for both primitive elements and group elements, which enable recursive operation.

Figure 6:
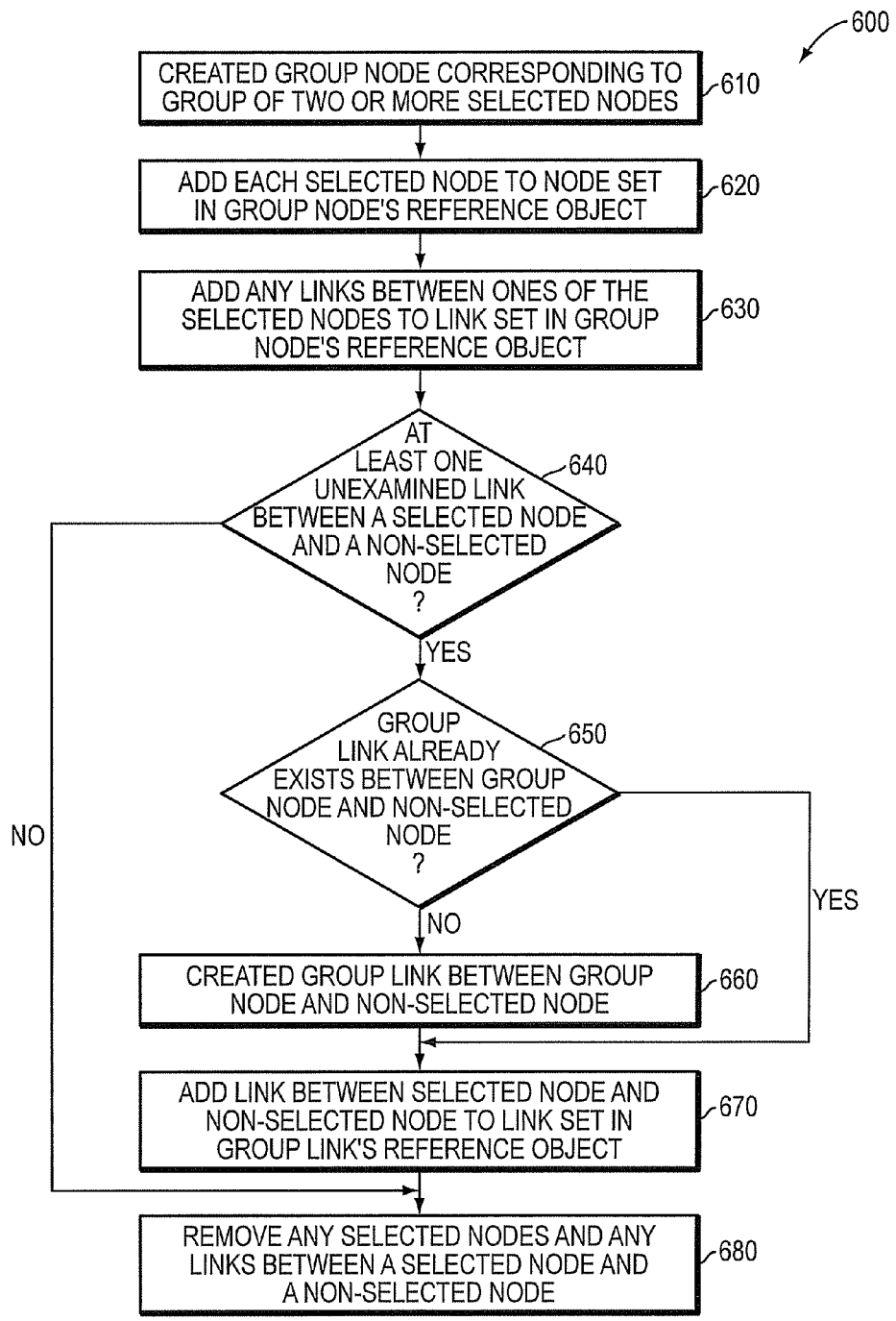
FIG. 6 is a flow diagram of a sequence of steps of an example recursive grouping algorithm to create a group node in a graph.

FIG. 6 is a flow diagram of a sequence of steps 600 of an example recursive grouping algorithm to create a group node in a graph. At step 610, a group node is created corresponding to a group of two or more selected nodes (e.g., primitive nodes or group nodes) to be subsumed. At step 620, each of the selected nodes is added to the set of nodes ("Node Set") 430 in the group node's Reference Object 415. At step 630, any links (e.g., primitive links or group links) that extend between ones of the selected nodes are added to the set of links ("Link Set") 435 in the group node's Reference Object 415. Any links (e.g., primitive links or group links) that extend between a selected node and a non-selected node (e.g., a primitive node or group node separate from the group) are identified and are set to be examined. At step 640, if there is at least one unexamined link between a selected node and a non-selected node, one such link is examined, and execution proceeds to step 650. At step 650, a determination is made whether a group link already exists between the group node and the non-selected node. If not, at step 660, a group link is created between the group node and the non-selected node and execution proceed to step 670. If so, execution proceeds directly to step 670. At step 670, the examined link between the selected node and the non-selected node is added to the listing of links ("Link Set") 530 in the group link's Reference Object 520. Execution then loops back to step 640. Such looping continues until there are no more links between a selected node and a non-selected node, and then execution proceeds to step 680. At step 680, any selected nodes, and any links that exists between a selected node and a non-selected node, are removed from the graph, to create a less-granular (simplified) representation.

Figure 7:
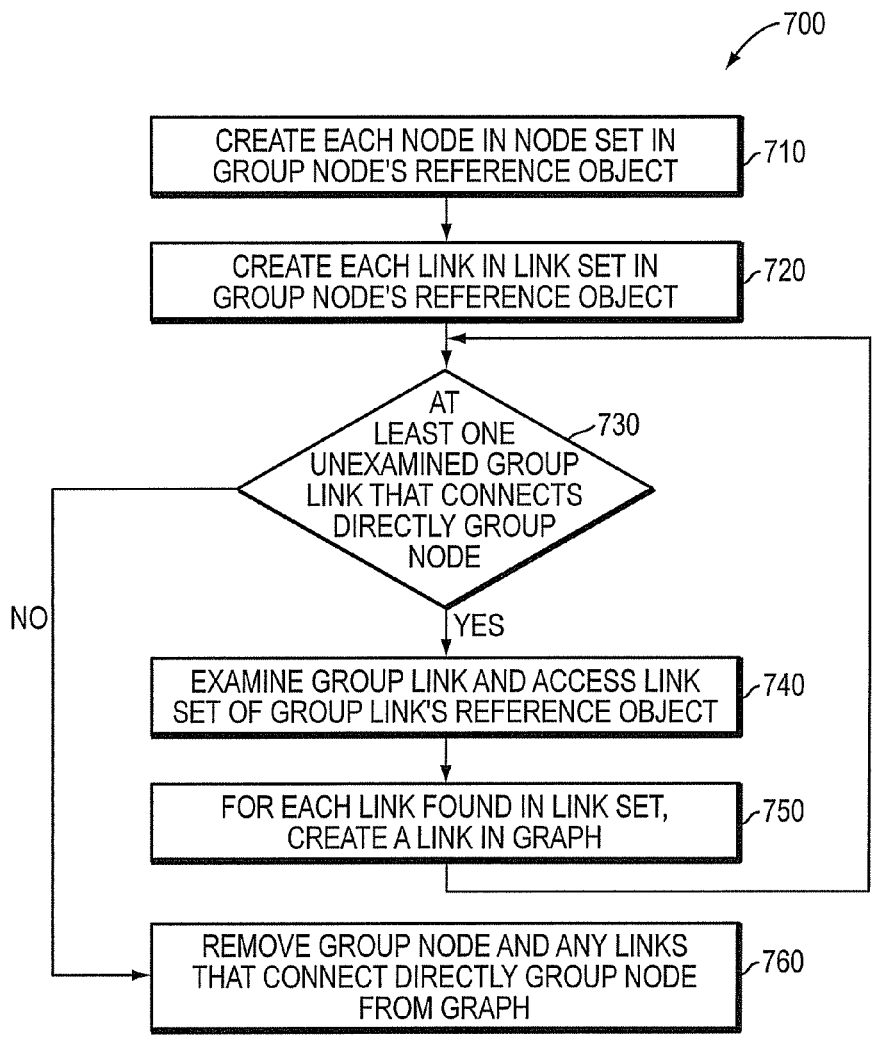
FIG. 7 is a flow diagram of a sequence of steps of an example recursive ungrouping algorithm that ungroups a group node of a graph.

FIG. 7 is a flow diagram of a sequence of steps 700 of an example recursive ungrouping algorithm that ungroups a group node of a graph. At step 710, each node (e.g., a primitive node or group node) in a set of nodes ("Node Set") 430 in the group node's Reference Object 415 is created in the graph. At step 720 each link (e.g., a primitive link or group link) in the set of links ("Link Set") 435 in the group node's Reference Object 415 is created in the graph. At step 730, if there is at least one unexamined one group link that connects directly to the group node, execution proceeds to step 740. At step 740, a group link is examined and the listing of links ("Link Set") 530 of that group link's Reference Object 520 is accessed. At step 750, for each link found in the listing of links ("Link Set") 530, a link (e.g., a primitive link or group link) is created in the graph. Execution then loops back to step 730. Eventually, at step 730, if there is not at least one unexamined group link that connects directly to the group node, execution proceeds to step 760. At step 760, the group node, and any links that connect directly to the group node, are removed from the graph, to create a more granular (unsimplified) representation.

Operation of the above described example grouping algorithm and ungrouping algorithm may be further illustrated by a sequence of examples. Referring to FIGS. 2 and 3, consider an example where primitive node A (FIG. 2) 204 and primitive node B (FIG. 2) 206 are merged into group node G1 (FIG. 3) 305. First, group node G1 305 is created corresponding to primitive node A and primitive node B that are being subsumed. Primitive node A and primitive node B are added to the set of nodes ("Node Set") 430 in group node G1's Reference Object 415. Primitive link AB (FIG. 2) 232 that extends between subsumed nodes A and B is added to the set of links ("Link Set") 435 in group node G1's Reference Object 415. Thereby, the following shorthand group node data structure is created:

G1={1, {{A, B},{A, B, Empty}}}

Further, primitive links XA 220, XB 222, BC 234, AY 242, and BY 244 originally existed between primitive node A and primitive node B that are being subsumed and non-selected nodes. Beginning with link XA, a determination is made whether a group link already exists between the non-selected node (for instance X 202) and the group node G1 305. Since one does not, a group link X1 310 is created between node X 202 and group node G1 305. Link XA 220 is added to the listing of links ("Link Set") 530 in the group link X1 310's Reference Object 520. Proceeding to primitive link XB 222, a determination is made that a group link X1 310 already exists between the non-selected node (here X 202) and the group node G1 305. Link XB 222 is thus added to the listing of links ("Link Set") 530 in group link X1's 310 Reference Object 520.

Thereby, the following shorthand group link data structure is created:

X1={X, G1, {{X, A, Empty}, {X, B, Empty}}}

By repeating the operations of steps 640-670 of FIG. 6 for other non-selected nodes, the following additional shorthand group link data structures are also created:

1Y={G1, Y, {{A, Y, Empty},{B, Y, Empty}}}
1C={G1, C, {{A, C, Empty},{B, C, Empty}}}
1D={G1, D, {{B, D, Empty}}}
1E={G1, E, {{B, E, Empty}}}

Finally, primitive node A 204, primitive node B 206, and primitive links XA 220, XB 222, BC 234, AY 242, and BY 244 of FIG. 2 are removed to create the simplified graph of FIG. 3.

Further, referring to FIGS. 2 and 3, consider an example where group node G1 (FIG. 3) 305 is ungrouped to restore primitive node A (FIG. 2) 204 and primitive node B (FIG. 2) 206. Primitive Node A 204 (having shorthand data structure {A,{{Empty},{Empty}}}) and primitive node B 206 (having shorthand data {B, {{Empty},{Empty}}}) are created due to their listing in the set of nodes ("Node Set") 430 in group node G1's Reference Object 415. Primitive link AB (having shorthand data structure {A, B, Empty}) is recreated due to its inclusion in the set of links ("Link Set") 435 in the G1's Reference Object 415.

Further, group links X1 (FIG. 3) 310, 1Y 315, 1C 320, 1D 325, and 1E 330 connected with group node G1 305 are dealt with. Beginning with group link X1 310, the listing of links ("Link Set") 530 in group link X1's Reference Object 520 is accessed, and primitive links XA (having shorthand data structure {X, A, Empty}) and primitive link XB (having shorthand data structure {X, B, Empty}) are restored to the graph.

By repeating the operations of steps 730-750 of FIG. 7 for other group links, the following additional shorthand data structures are also recreated:

{A, Y, Empty} and {B, Y, Empty} from group link 1Y
{A, C, Empty} and {B, C, Empty} from group link 1C
{B, D, Empty} from 1D
{B, E, Empty} from 1E Finally, group node G1 205 and group links X1 310, 1Y 315, 1C 320, 1D 325, and 1E 330 of FIG. 3 are removed to recreate the unsimplified graph of FIG. 2.

Figure 8:
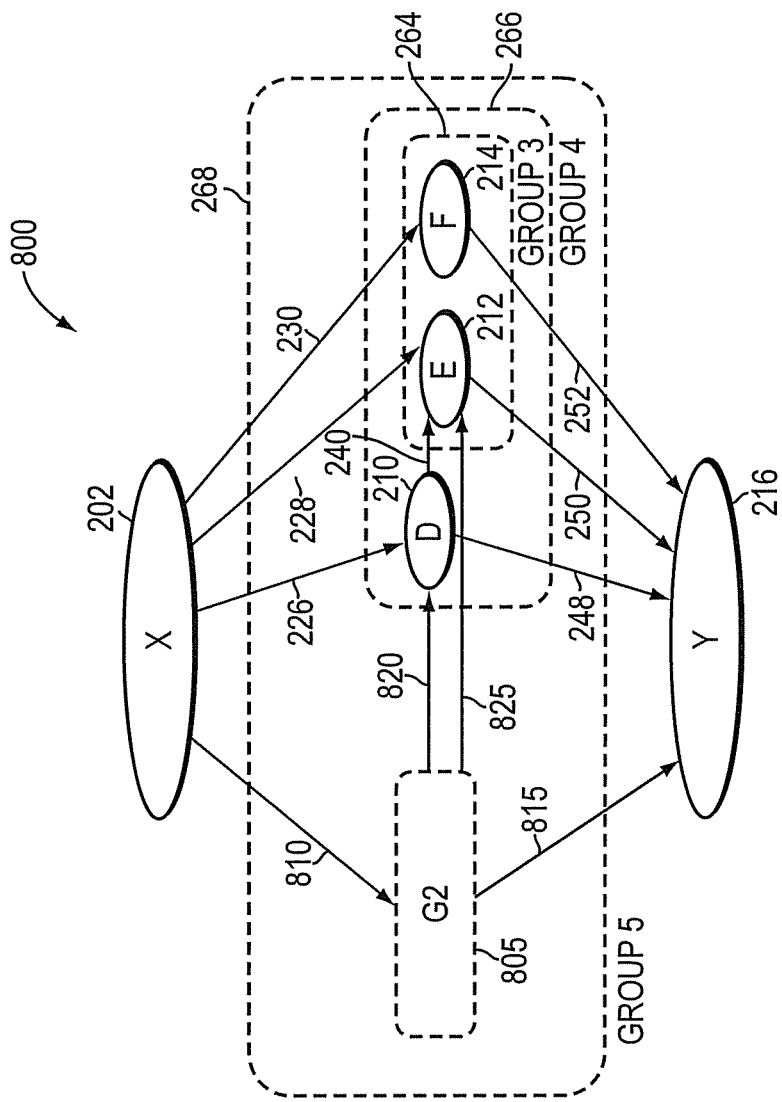
FIG. 8 is an abstracted diagram of the example graph of FIG. 2, showing Group 2 replaced by group node G2.

As discussed above, the grouping algorithm and ungrouping algorithm permit nesting of group nodes. FIG. 8 is an abstracted diagram 800 of the example graph of FIG. 2, showing Group 2 262 replaced by group node G2 805. With the creation of group node G2 805, group node G1 (FIG. 3) 305 (which itself subsumes primitive nodes A 202 and B 204) and primitive node C 208 are removed from the graph topology. Thereby, an even further simplified graph is created. Operation of the above described example grouping algorithm and ungrouping algorithms may be further illustrated in reference to FIG. 8.

To produce the further simplified graph depicted in FIG. 8, the grouping algorithm may first create group node G2 805 corresponding to Group node G1 (FIG. 3) 305 and primitive node C 208 that are being subsumed. Group node G1 and primitive node B are added to the set of nodes ("Node Set") 430 in group node G2's Reference Object 415. Group link 1C 320 that extends between subsumed nodes G1 and C is added to the set of links ("Link Set") 435 in the group node G3's Reference Object 415. Thereby, the following shorthand group node data structure is created:

G2={2, {{G1, C},{1,C, 1C}}}

Further, group links X1 (FIG. 3) 310, 1Y 315, 1D 325 and 1E 330, and primitive links XC 224 and CY 246 between Group node G1 305 and primitive node C, are adapted. Beginning with link X1, a determination is made whether a group link already exists between the relevant non-selected node X 202 and the group node G2 805. Since one does not, a group link X2 810 is created between node X 202 and group node G2 805. Link X1 310 is added to the listing of links ("Link Set") 530 in the group link X2 810's Reference Object 520. Proceeding to primitive link XC 224, a determination is made that a group link X2 810 already exists between the relevant non-selected node X 202 and the group node G2 805. Primitive Link XC 224 is thus added to the listing of links ("Link Set") 530 in the group link X2 810's Reference Object 520.

Thereby, the following shorthand group link data structure is created:

X2={X, G2, {{X, 1, X1},{X, BC, Empty}}}

In similar manner, the following additional shorthand link data structures are also created:

2Y={G2, Y, {{1, Y, 1Y}, {X, C, Empty}}}
2D={G2, D, {{1, D, 1D}}}
2E={G2, E,{{1, E, 1E}}}

Finally, group node G1 (FIG. 3) 305 (which itself subsumes primitive nodes A 202 and B 204) and primitive node C 208 are removed to create the even further simplified graph of FIG. 8.

Further, referring to FIGS. 8 and 3, consider an example where the ungrouping algorithm is applied to group node G2 (FIG. 8) 805 to restore group node G1 (FIG. 3) 305 and primitive node C (FIG. 3) 208. Group Node G1 305 (having shorthand data structure {1, {{A, B},{A, B, Empty}}}) and primitive node C 208 (having shorthand data {C, {{Empty}, {Empty}}}) are recreated due to their listing in the set of nodes ("Node Set") 430 in group node G2's Reference Object 415. Group link 1C 320 is recreated due to its inclusion in the set of links ("Link Set") 435 in the G2's Reference Object 415.

Further, group links X2 (FIG. 8) 810, 2Y 815, 2D 820 and 2E 825 are connected to group node G2 805 and are dealt with. Beginning with group link X2 810, the listing of links ("Link Set") 530 in group link X2's Reference Object 520 is accessed, and group link X1 310 (having shorthand data structure {X, G1, {X, A, Empty},{X, B, Empty}}} and primitive link XC (having shorthand data structure{X, C, Empty}) are restored to the graph.

In similar manner the following additional shorthand links data structures are also recreated:

{G1, Y,{{A, Y, Empty},{B, Y, Empty}}} and {C, Y, Empty} from group link 2Y
{G1, D, {{B, D, Empty}}} from 2D
{G1, E, {{B, E, Empty}}} from 2E Finally, group node G2 805 and group links X2 810, 2Y 815, 2D 820 and 2E 825 of FIG. 8 are removed to recreate the less simplified graph of FIG. 3.

Figure 9:
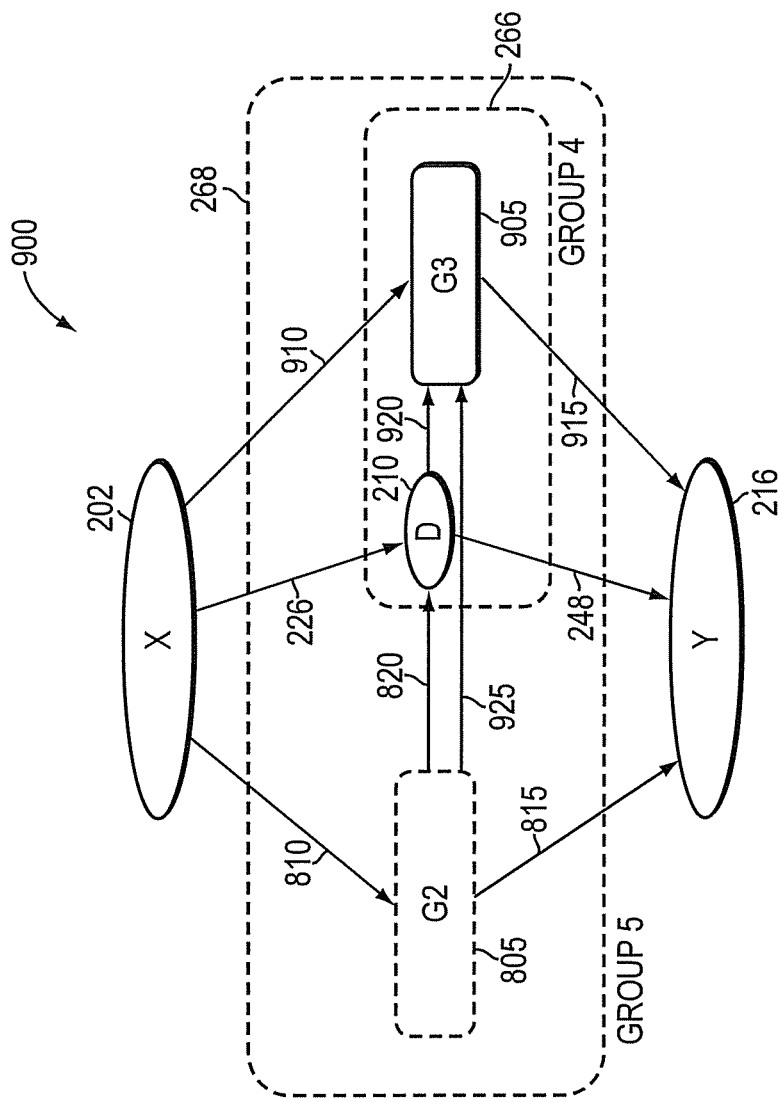
FIG. 9 is an abstracted diagram of the example graph of FIG. 2, showing Group 3 replaced by group node G3.

By way of further example, FIG. 9 is an abstracted block diagram 900 of the example graph of FIG. 2, showing Group 3 264 replaced by group node G3 905. The creation of group node G3 may occur in a similar manner to the examples discussed above. The following shorthand group node data structure is created:

G3={3, {{E, F},{Empty}}}

Further, primitive links XE (FIG. 8) 228, XF 230, DE, 240, EY 250, FY 252 and group link 2E 825 between nodes E and F and non-selected nodes are adapted. In similar manner as discussed above, the following shorthand group link data structures are created by the example grouping algorithm to account for these links:

X3={X, G3, {{X, E, Empty},{X, F, Empty}}}
3Y={G3, Y, {{E, Y, Empty},{F, Y, Empty}}}
D3={D, G3, {{D, E, Empty}}}
23={G2, G3, {{2, E, 12E}}}

Finally, primitive node E 212 and primitive node F 214 and links XE 228, XF 230, DE, 240, EY 250, FY 252 and 2E 825 are removed to create the even further simplified graph of FIG. 9.

The above described example ungrouping algorithm may be applied to group node G3 905 in similar manner as discussed above, to restore primitive node E 212 and primitive node F 214 and links XE 228, XF 230, DE, 240, EY 250, FY 252 and 2E 825, and to remove group node G3 905 and group links X3 910, 3Y 915, D3 920, and 23 925.

Figure 10:
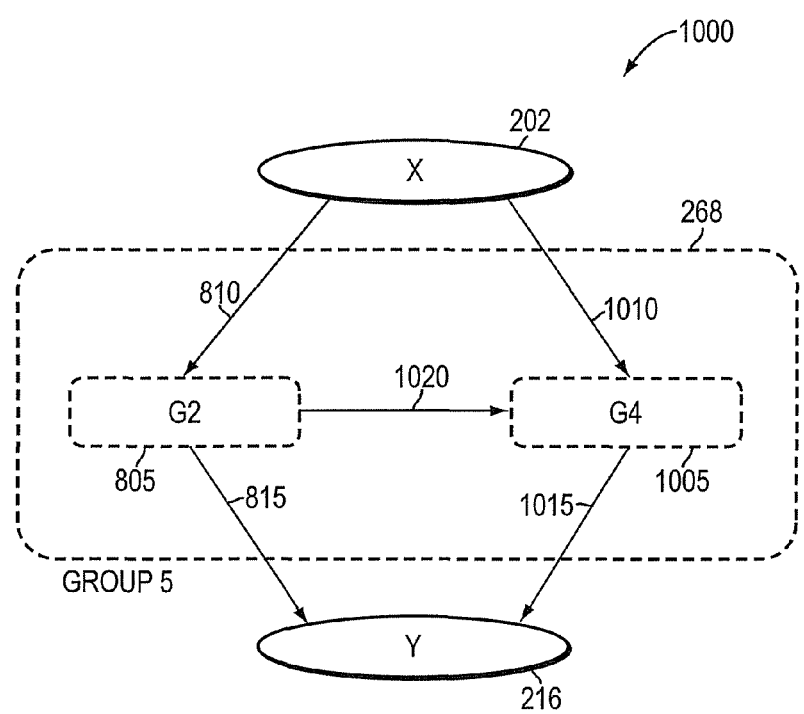
FIG. 10 is an abstracted diagram of the example graph of FIG. 2, showing Group 4 replaced by group node G4.

By way of further example, FIG. 10 is an abstracted block diagram 1000 of the example graph of FIG. 2, showing Group 4 266 replaced by group node G4 1005. The creation of group node G4 1005 may occur in a similar manner to the examples discussed above. The following shorthand group node data structure is created to subsume primitive node D 210, group node G3 905 and group link D3 920:

G4={4, {{D, G3},{D, 3, D3}}}

Further, primitive links XD (FIG. 9) 226 and DY 248, and group links 2D 820, X3 910, 3Y 915 and 23 925 are adapted. In similar manner to as discussed above, the following shorthand group link data structures are created by the example grouping algorithm to account for these links:

X4={X, G4, {{X, D, Empty}, {X, 3, X3}}}
4Y={G4, Y, {{D, Y, Empty}, {3, Y, 3Y}}}
24={G2, G4, {{2, D, 2D},{2,3, 23}}}

Finally, primitive node D 210, group node G3 905 and links D3 920, XD 226, DY 248, 2D 820, X3 910, 3Y 915 and 23 925 are removed to create the even further simplified graph of FIG. 10.

The above described ungrouping algorithm may be applied to group node G4 1005 in similar manner as discussed above, to restore primitive node D 210, group node G3 905 and links D3 920, XD 226, DY 248, 2D 820, X3 910, 3Y 915 and 23 925, and remove group node G4 1005 and group links X4 1010, 4Y 1015, and 24 1020.

Figure 11:
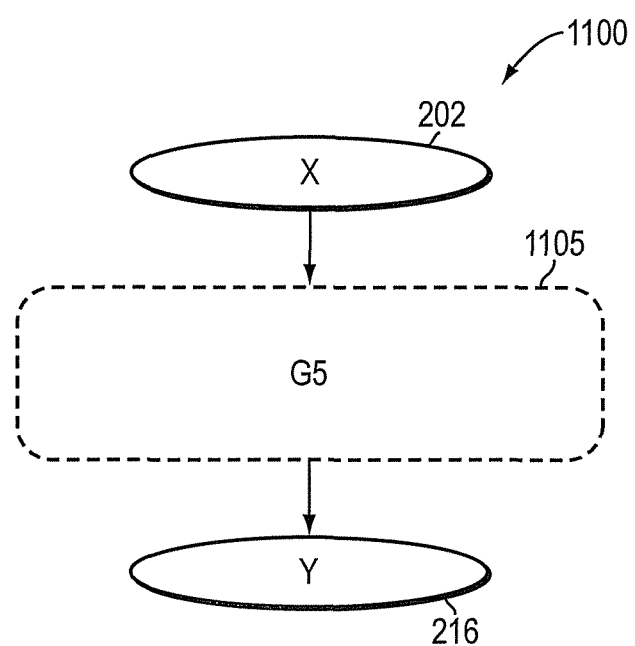
FIG. 11 is an abstracted diagram of the example graph of FIG. 2, showing Group 5 replaced by group node G5.

By way of further example, FIG. 11 is an abstracted block diagram 1100 of the example graph of FIG. 2, showing Group 5 268 replaced by group node G5 1105. The creation of group node G5 1105 may occur in a similar manner to the examples discussed above. The following shorthand group node data structure is created to subsume group node G2 (FIG. 10) 805, group node G4 1005 and group link 24 1020:

G5={5, {{G2, G4},{2, 4, 24}}}

Further, group links X4 1010, 4Y 1015, X2 810 and 2Y 815 are adapted. In similar manner to as discussed above, the following shorthand group link data structures are created by the example grouping algorithm to account for these links:

X5={X, G5, {{X, 2, X2}, {X, 4, X4}}}
5Y={G5, Y, {{2, Y, 2Y}, {4, Y, 4Y}}}

Finally, group nodes G2 805 and G4 1005 and group links X4 1010, 4Y 1015, X2 810 and 2Y 815 are removed to create the even further simplified graph of FIG. 11.

The example ungrouping algorithm may be applied to group node G5 1105 in a similar manner as discussed above, to restore group node G2 805, group node G4 1005 and group links 24 1020, X4 1010, 4Y 1015, X2 810 and 2Y 815.

The modeling application 145 that implements the data structures, and the grouping and ungrouping algorithms, may take any of a variety of forms in different embodiments. For purposes of further illustrating the techniques described herein, consider an example where the modeling application 145 is an associative and parametric modeling application, such as the MicroStation Generative Components™ associative and parametric modeling application.

Figure 12:
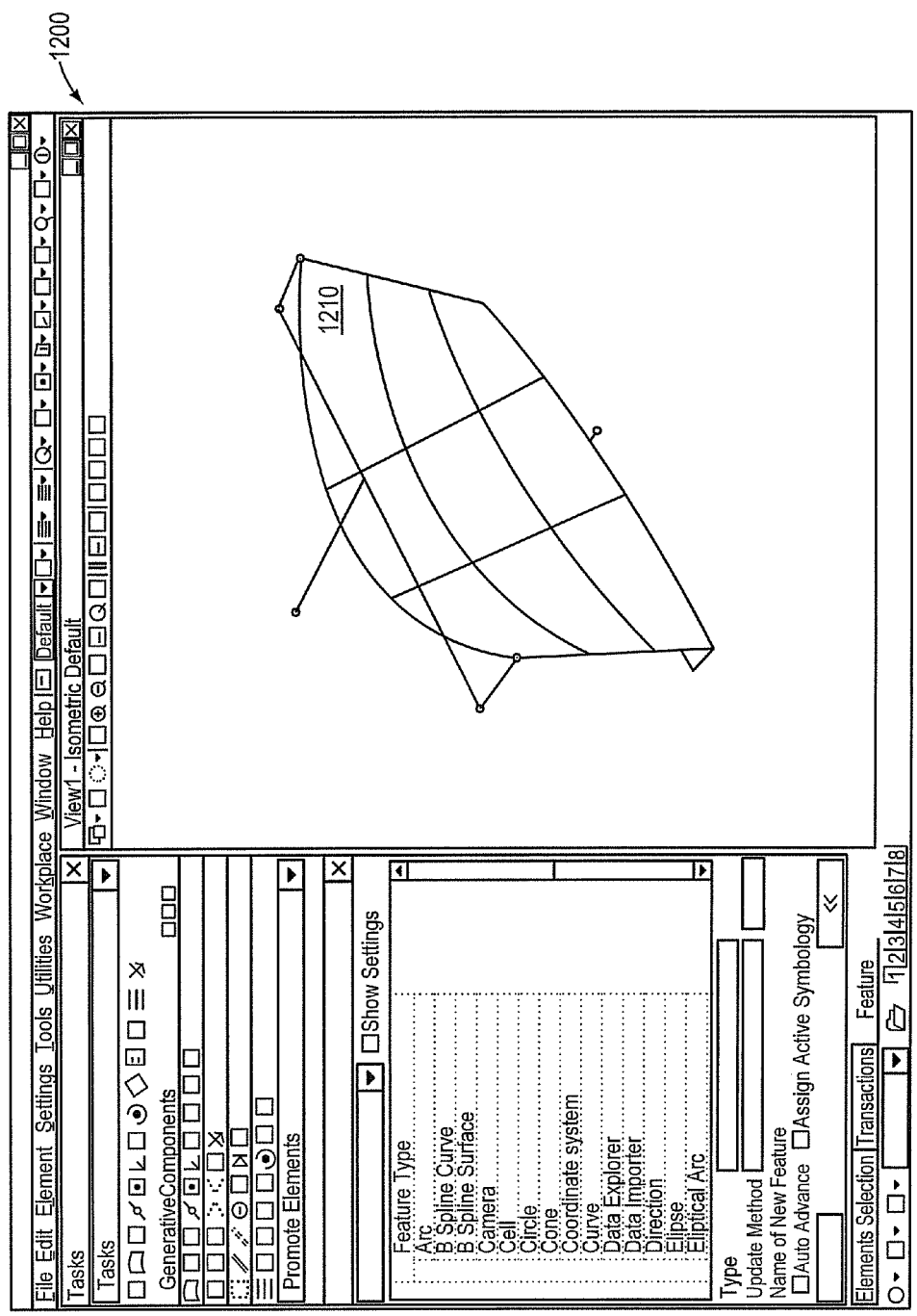
FIG. 12 is a screen shot of an example user interface of an associative and parametric modeling application showing an isometric view of a model.

FIG. 12 is a screen shot 1200 of an example user interface of an associative and parametric modeling application showing an isometric view 1210 of a model. The model may correspond to any of a variety of physical entities. For example, here, the model represents a three-dimensional object that may be constructed. The model may be created and adapted using a number of transactions, defined a user via one of the input devices (FIG. 1) 170 of the computer 105, or created in another manner. Further details regarding the generation of a model through use of transactions may be found in U.S. patent application Ser. No. 12/030,408, which was incorporated by reference above.

Figure 13:
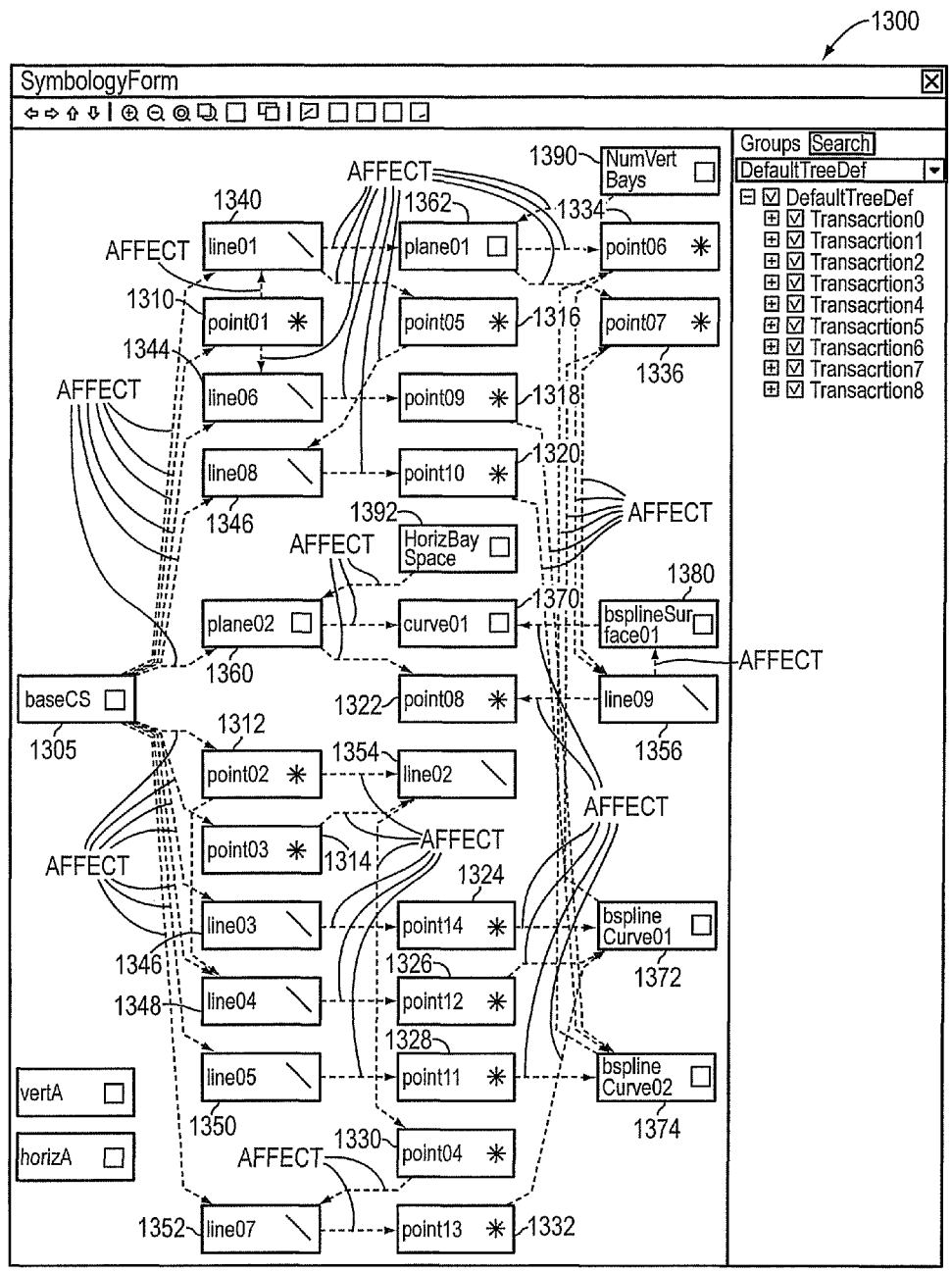
FIG. 13 is a screen shot of an example user interface of an associative and parametric modeling application showing an unsimplifed graph corresponding to the model of FIG. 12.

FIG. 13 is a screen shot 1300 of an example user interface of an associative and parametric modeling application showing an unsimplifed graph corresponding to the model of FIG. 12. The graph includes a number of nodes, including a base node 1305, nodes 1310-1336 that represent points (i.e., a zero dimensional entity specifying a location in space), nodes 1340-1356 that represent lines (i.e., an element joining two points in space) nodes 1360,1362 that represent planes (i.e. a two-dimensional object with an origin point that may be visualizes as flat infinite surface), nodes 1370-1374 that represent curves, a node 1380 that represents a surface, and nodes 1390-1392 that represent a number of vertical and horizontal bays. Each of the nodes in the graph may be maintained in memory by a corresponding node data structure 400, according to the format discussed above in reference to FIG. 4A.

Further the graph includes a number of lines (unnumbered), which interconnect ones of the nodes 1310-1390. Such lines indicate which nodes affect which other nodes. Each of the lines in the graph may be maintained in memory by a corresponding line data structure 500, according to the format discussed above in reference to FIG. 5A.

By application of the above described grouping algorithm, the elements of the graph shown in FIG. 13 may be grouped, for example, into groups corresponding to transactions, or, alternatively into customized groupings. Such grouping may be used to decrease the number of nodes displayed to a user, to permit a user to more easily consume the semantics of the graph.

Figure 14:
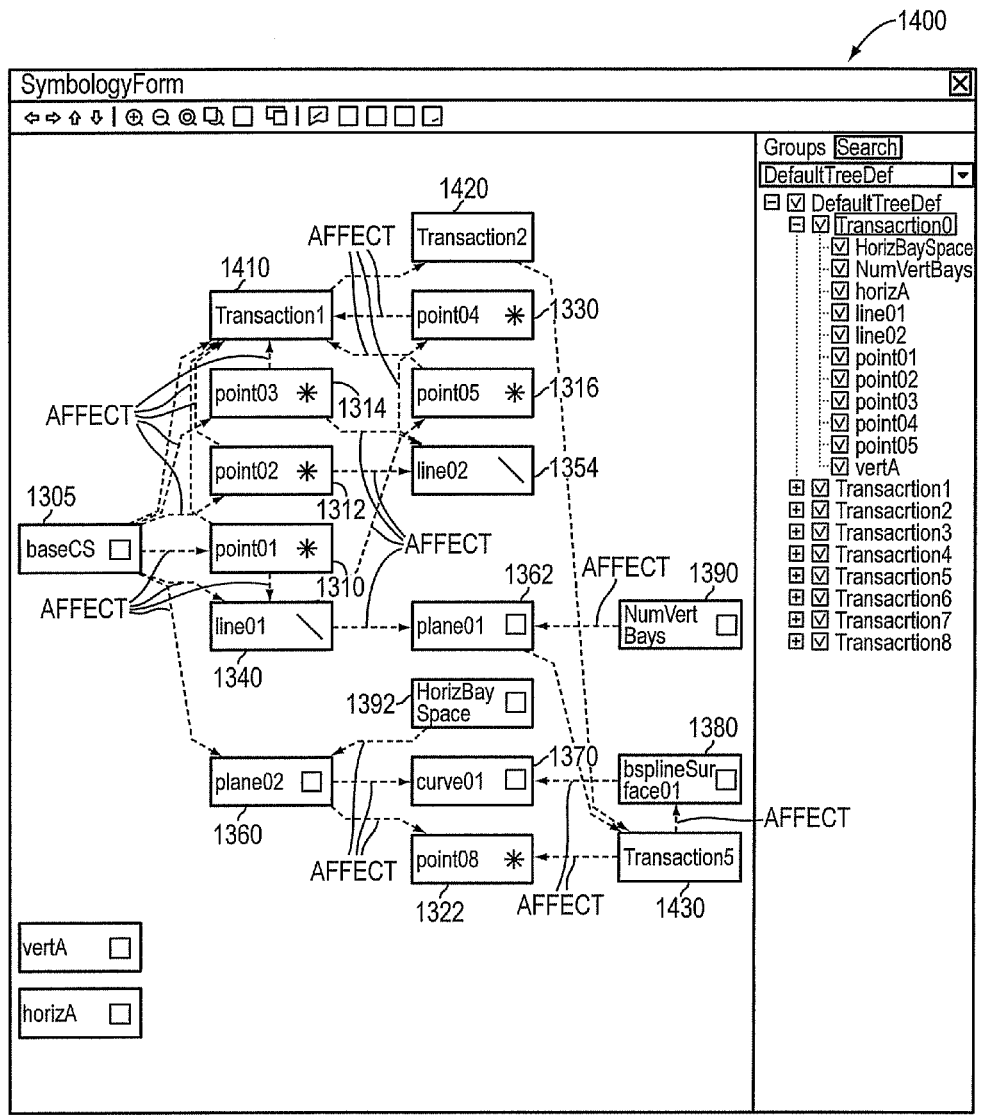
FIG. 14 is a screen shot of an example user interface of the associative and parametric modeling application showing a simplified graph corresponding to the model of FIG. 12.

FIG. 14 is a screen shot 1400 of an example user interface of the associative and parametric modeling application showing a simplified graph corresponding to the model of FIG. 12. Group nodes ("Transaction 1") 1410, ("Transaction 2") 1420, ("Transaction 5") 1430 have replaced various of the elements (e.g., points and lines) of FIG. 13. By simplifying the graph, the granularity of the information conveyed is reduced. Since the above described example grouping algorithm preserves the semantics of the elements subsumed, the user may readily access removed semantics via a query entered in the user interface.

Figure 15:
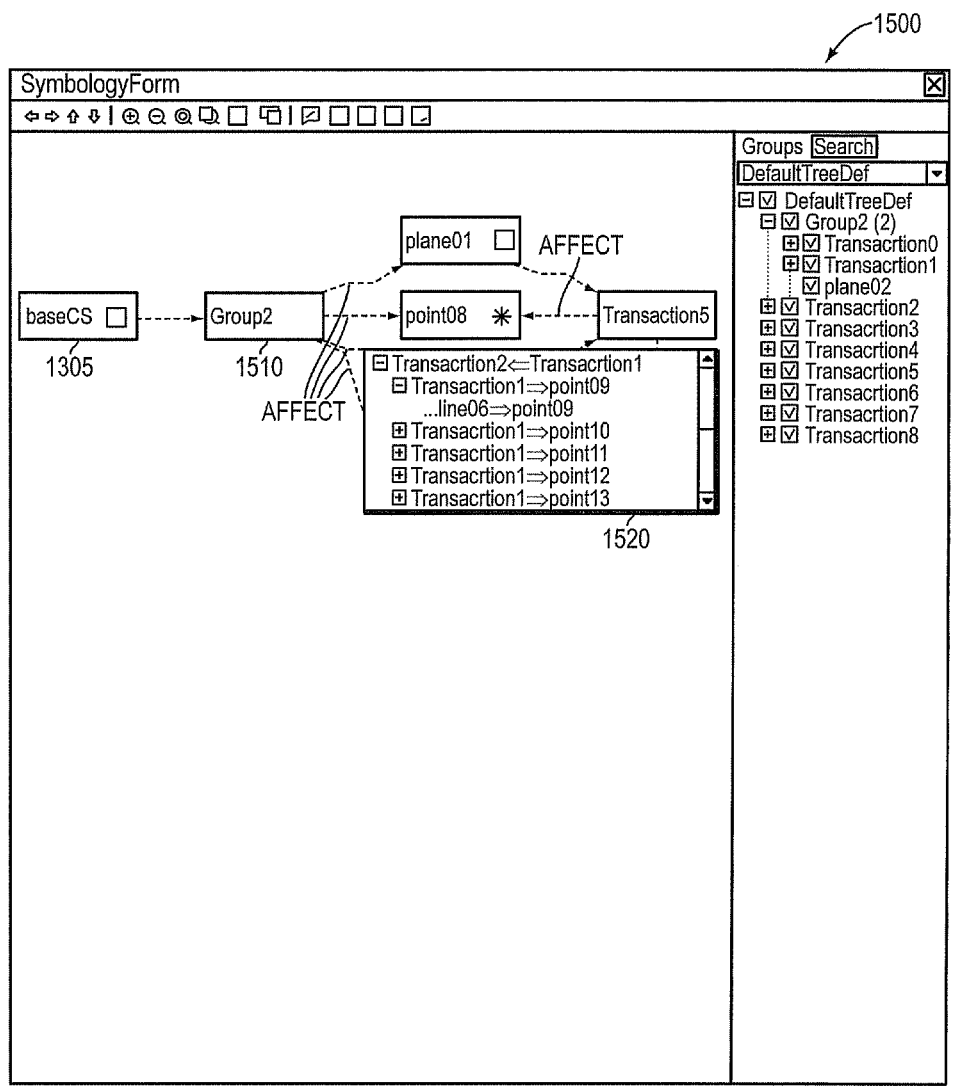
FIG. 15 is a screen shot of an example user interface of the associative and parametric modeling application showing a query operation being performed on a group node ("Group 2") of a graph corresponding to the model of FIG. 12.

FIG. 15 is a screen shot 1500 of an example user interface of an associative and parametric modeling application showing a query operation being performed on a group node ("Group 2") 1510 of a graph corresponding to the model of FIG. 12. The group node Group 2 subsumes group nodes "Transaction 0" and "Transaction 1" and primitive node "plane 02". Group nodes "Transaction 0" and "Transaction 1" subsume additional elements. In response to input by a user, a query operation is performed on group node Group 2 and a display 1520 of the elements subsumed is shown to the user. In this manner, the user may access the preserved semantics of the elements subsumed, absent restoring the entire unsimplified graph.

While the above description discusses various embodiments of the present disclosure, it should be apparent that a number of modifications and/or additions may be made without departing from the disclosure's intended spirit and scope.

For example, while an example format for a node data structure 400 and a link data structure 500 are described above, it should be understood that such data structures may alternatively have different formats, including different arrangements of data and tags, and may include additional data. Such data structures may alternatively be divided into a plurality of independent data structures, that each contain some subpart of the overall information maintained for the respective element. Similarly, such data structures may alternatively be combined into consolidated data structures that include information related to a plurality of elements. Accordingly, the above descriptions of the example node data structure 400 and the example link data structure 500 should be taken by way of example.

Further, it should be understood that many of the above-described techniques may be implemented in software, in hardware, or in a combination thereof. A software implementation may include computer-executable instructions stored in a non-transitory computer-readable storage medium, such as a volatile or persistent memory, a hard-disk, a compact disk (CD), or other tangible medium. A hardware implementation may include specially configured processors, logic circuits, application specific integrated circuits, and/or other types of hardware components. Further, a combined software/hardware implementation may include both computer-executable instructions stored in a non-transitory computer-readable storage medium, as well as one or more tangible hardware components, for example, processors, memories, etc. Accordingly, it should be understood that the above descriptions are meant to be taken only by way of example.

What is claimed is:

1. A computer-implemented method for maintaining semantics of a graph that corresponds to a model of a three-dimensional (3-D) structure, the method comprising:

creating node data structures by a processor of a computer executing a modeling application for storage in a memory of the computer, instantiations of which store data that describes primitive nodes and group nodes of the graph, each node data structure that describes a primitive node to store a node name of a primitive node that represents a portion of the 3-D structure, and each node data structure that describes a group node to store a node name of a group node that represents a collection of portions of the 3-D and a node reference object that lists a set of nodes subsumed by the group node and a set of links subsumed by the group node;

creating link data structures by the processor for storage in the memory of the computer, instantiations of which store data that describes primitive links and group links of the graph, each link data structure that describes a primitive link to represent a relationship between portions of the 3-D structure and to store an indication of where the primitive link extends from and an indication of where the primitive link extends to, and each link data structure that describes a group link to represent a relationship between collections of portions of the 3-D structure, and to store an indication of where the group link extends from, an indication of where the group link extends to, and a link reference object that lists a set of links subsumed or replaced by the group link; and storing the node data structures and the link data structures in the memory of the computer to maintain the semantics of the graph.

2. The computer-implemented method of claim 1, wherein, for at least one group node, the node reference object lists one or more other group nodes subsumed by the group node.

3. The computer-implemented method of claim 1, wherein, for at least one group link, the link reference object lists at least one other group link subsumed or replaced by the group link.

4. The computer-implemented method of claim 1, further comprising:

displaying the graph in a user interface on a display screen of the computer.

5. The computer-implemented method of claim 1, wherein the 3-D structure whose model the graph corresponds to is a 3-D structure to be constructed.

6. A computer-implemented method for grouping nodes of a graph that corresponds to a model of a three-dimensional (3-D) structure while maintaining semantics of the graph, the method comprising:

creating, by a processor of a computer executing a modeling application for storage in a memory of the computer, a node data structure that describes a group node that represents a collection of portions of the 3-D structure, the node data structure that describes the group node to include a node name of the group node and a node reference object that lists a group of two or more selected nodes of the graph that are to be subsumed and a set of links subsumed by the group node, each selected node to be one of a primitive node and another group node of the graph, wherein each primitive node represents a portion of the 3-D structure and each link represents a relationship between portions of the 3-D structure;

adding each of the selected nodes to the set of nodes in the node reference object;

adding any links that extend between ones of the selected nodes to the set of links in the node reference object; and for any links between a selected node and a non-selected node, examining, by the processor of the computer, each such link, and determining whether a group link already exists between the group node and the non-selected node, wherein each group link represents a relationship between collections of portions of the 3-D structure corresponding to a set of links subsumed or replaced by the group link, and if not, creating a group link between the group node and the non-selected node and adding the examined link to the set of links in the node reference object, and if so, adding the examined link to the set of links in the node reference object.

7. The computer-implemented method of claim 6, further comprising:

removing any selected nodes, and any links that exists between a selected node and a non-selected node, from the graph to create a simplified graph.

8. The computer-implemented method of claim 7, further comprising:

displaying the simplified graph in a user interface on a display screen of the computer.

9. The computer-implemented method of claim 6, wherein at least one selected node of the graph that is to be subsumed by the group node is another group node.

10. The computer-implemented method of claim 6, wherein at least one examined link that is added to the set of links is another group link.

11. The computer-implemented method of claim 6, wherein the 3-D structure whose model the graph corresponds to is a 3-D structure to be constructed.

12. The computer-implemented method of claim 6, further comprising:

creating node data structures, instantiations of which store data that describes primitive nodes and group nodes of the graph, each node data structure that describes a primitive node to store a node name of a primitive node; and creating link data structures, instantiations of which store data that describes primitive links and group links of the graph, each link data structure that describes a primitive link to store an indication of where the primitive link extends from and an indication of where the primitive link extends to.

13. A computer-implemented method for ungrouping nodes of a graph that corresponds to a model of a three-dimensional (3-D) structure while maintaining semantics of the graph, the method comprising:

accessing, from a memory of a computer by a processor of the computer executing a modeling application, a node data structure that describes a group node that represents a collection of portions of the 3-D structure, the node data structure that describes the group node to include a node name of the group node and a node reference object that lists a set of nodes subsumed by the group node and a set of links subsumed by the group node;

creating each node in the set of nodes indicated in a node reference object in the graph, each node representing a portion of the 3-D structure;

accessing, from the memory of the computer by the processor of the computer executing the modeling application, one or more link data structures that describe one or more group links that connect directly to the group node in the graph, wherein a group link represents a relationship between collections of portions of the 3-D structure, each link data structure that describes a group link to store an indication of where the group link extends from, an indication of where the group link extends to, and a link reference object that lists a set of links subsumed or replaced by the group link;

for an unexamined group link of the one or more group links,
examining the link data structure that describes the unexamined group link and accessing one or more links indicated in the link reference object, and for each link indicated in the link reference object, create a link in the graph, the link representing a relationship between portions of the 3-D structure; and repeating the examining until there is no longer any unexamined group links that connect directly to the group node in the graph.

14. The computer-implemented method of claim 13, further comprising:
removing the group node and any links that connect directly to the group node from the graph to create an unsimplified graph.

15. The computer-implemented method of claim 14, further comprising:
displaying the unsimplified graph in a user interface on a display screen of the computer.

16. The computer-implemented method of claim 13, wherein at least one node in the set of nodes indicated in the node reference object is another group node.

17. The computer-implemented method of claim 13, wherein at least one link in the one or more links indicated in the link reference object is another group link.

18. The computer-implemented method of claim 13, wherein the 3-D structure whose model the graph corresponds to is a 3-D structure to be constructed.

19. The computer-implemented method of claim 13, further comprising:
creating node data structures, instantiations of which store data that describes primitive nodes and group nodes of the graph, each node data structure that describes a primitive node to store a node name of a primitive node; and creating link data structures, instantiations of which store data that describes primitive links and group links of the graph, each link data structure that describes a primitive link to store an indication of where the primitive link extends from and an indication of where the primitive link extends to.

20. A computer configured to maintain semantics of a graph that corresponds to a model of a three-dimensional (3-D) structure, the computer comprising:
a display screen;
a processor configured to execute executable instructions; and
a memory configured to store executable instructions for a modeling application that, when executed by the processor, are operable to:
create node data structures that store data that describes primitive nodes and group nodes of the graph,
each node data structure that describes a primitive node to store a node name of a primitive node that represents a portion of the 3-D structure,
each node data structure that describes a group node to store a node name of a group node that represents a collection of portions of the 3-D structure and a node reference object that lists a set of nodes subsumed by the group node and a set of links subsumed by the group node;
create link data structures that store data that describes primitive links and group links of the graph,
each link data structure that describes a primitive link to represent a relationship between portions of the 3-D structure and to store an indication of where the primitive link extends from and an indication of where the primitive link extends to, and,
each link data structure that describes a group link to represent a relationship between collections of portions of the 3-D structure and to store an indication of where the group link extends from and an indication of where the group link extends to, and a link reference object that lists a set of links subsumed or replaced by the group link;
store the node data structures and the link data structures in the memory; and
display the graph as a simplified graph or an unsimplified graph in a user interface on the display screen using the node data structures and the link data structures.

21. The computer of claim 20, wherein, for at least one group node, the node reference object lists one or more other group nodes subsumed by the group node.

22. The computer of claim 20, wherein, for at least one group link, the link reference object lists at least one other group link subsumed or replaced by the group link.

23. The computer of claim 20, wherein the 3-D structure whose model the graph corresponds to is a 3-D structure to be constructed.

* * * * *